United States Patent
Kennedy et al.

(10) Patent No.: US 10,320,834 B1
(45) Date of Patent: Jun. 11, 2019

(54) RETUNING OF RANDOM CLASSIFICATION FORESTS TO IMPROVE EFFICACY

(71) Applicant: Symantec Corporation, Mountain View, CA (US)

(72) Inventors: Mark Kennedy, Gardena, CA (US); Barry Laffoon, Glendale, CA (US)

(73) Assignee: Symantec Corporation, Mountain View, CA (US)

( * ) Notice: Subject to any disclaimer, the term of this patent is extended or adjusted under 35 U.S.C. 154(b) by 238 days.

(21) Appl. No.: 15/193,653

(22) Filed: Jun. 27, 2016

(51) Int. Cl.
  *G06F 16/22* (2019.01)
  *H04L 29/06* (2006.01)
  *H04W 12/08* (2009.01)
  *G06F 16/2457* (2019.01)

(52) U.S. Cl.
  CPC ........ *H04L 63/145* (2013.01); *G06F 16/2246* (2019.01); *G06F 16/24578* (2019.01); *H04W 12/08* (2013.01)

(58) Field of Classification Search
  CPC .............................. H04L 63/145; H04W 12/08
  USPC .......................................................... 726/23
  See application file for complete search history.

(56) References Cited

U.S. PATENT DOCUMENTS

| | | | |
|---|---|---|---|
| 9,690,938 B1 * | 6/2017 | Saxe | G06F 21/563 |
| 2006/0179019 A1 * | 8/2006 | Bradski | G06N 99/005 |
| | | | 706/20 |
| 2009/0281981 A1 * | 11/2009 | Chen | G06K 9/6282 |
| | | | 706/56 |
| 2013/0191915 A1 * | 7/2013 | Antonakakis | H04L 63/14 |
| | | | 726/23 |

OTHER PUBLICATIONS https://en.wikipedia.org/wiki/Logistic_regression, Logistic Regression.

* cited by examiner

*Primary Examiner* — Jason K Gee
*Assistant Examiner* — Angela R Holmes
(74) *Attorney, Agent, or Firm* — Holland & Hart LLP

(57) ABSTRACT

Methods and apparatus for optimizing computer detection of malware using pattern recognition by refreshing random classification forests are described. In one embodiment, the method may include building a random forest with two or more binary decision trees based at least in part on a first set of categorized data, sending the random forest to a client device with a first random forest control value, identifying a second set of categorized data different from the first set of categorized data, calculating a second random forest control value based on the second set of categorized data and sending the second random forest control value to the client device.

20 Claims, 11 Drawing Sheets

RETUNING OF RANDOM CLASSIFICATION FORESTS TO IMPROVE EFFICACY

BACKGROUND

Advancements in media delivery systems and data-related technologies continue to increase at a rapid pace. Increasing demand for accessible data has influenced the advances made to data-related technologies. Computer systems have increasingly become an integral part of data creation, data usage, and data storage. Computer systems may be used to carry out several data-related functions. The wide-spread access to data has been accelerated by the increased use of computer networks, including the Internet and cloud networking.

The wide-spread use of computers, however, has come with the increased cost and continued spread of computer viruses and malware. As computing devices and mobile computing devices become more ubiquitous throughout the world, malware creators are given an increased number of computer systems to infect. In addition, malware creators are continually devising new ways to infect computer systems with new types of malware. Nevertheless, benefits may be realized by providing systems and methods for improving malware detection.

SUMMARY

According to at least one embodiment, a method for optimizing computer detection of malware using pattern recognition by refreshing random classification forests is described. In one embodiment, the method may include building a random forest with two or more binary decision trees based at least in part on a first set of categorized data, sending the random forest to a client device with a first random forest control value, identifying a second set of categorized data different from the first set of categorized data, calculating a second random forest control value based on the second set of categorized data and sending the second random forest control value to the client device.

In some embodiments, the method may include implementing the second random forest control value in the random forest on the client device in place of the first random forest control value and performing a security action based at least in part on the second random forest control value. In some cases, the method may include calculating a first set of confidence scores based at least in part on the first set of categorized data, and calculating a second set of confidence scores based at least in part on the second set of categorized data. In some cases, the first random forest control value may include at least one of the first set of confidence scores and a first threshold of conviction. Likewise, in some cases, the second random forest control value may include at least one of the second set of confidence scores and a second threshold of conviction.

In some embodiments, the method may include associating a random subset of the first set of categorized data with one of the binary decision trees of the random forest and running the random subset of the first set of categorized data down the associated binary decision trees of the random forest. In some cases, the first set of categorized data may include malware files and clean files. In some embodiments, the random subset of the first set of categorized data may include a random selection of at least one of the malware files and at least one of the clean files. In some cases, a number of malware files in the random subset equaling a number of clean files in the random subset.

In some embodiments, calculating the first or second set of confidence scores may include calculating a confidence score for each leaf node of the random forest based at least in part on data from the first set of categorized data or the second set of categorized data being ran through the random forest. In some cases, calculating the first threshold of conviction for the random forest may be based at least in part on an aggregate of the first set of confidence scores, and calculating the second threshold of conviction may be based at least in part on an aggregate of the second set of confidence scores.

In some embodiments, calculating the first or second thresholds of conviction may include calculating true positive and false positive rates for each leaf node of the random forest in conjunction with the first or second set of categorized data being ran through the random forest, generating a receiver operating characteristic (ROC) curve based on the calculated true positive and false positive rates of each leaf node, and selecting a value along the ROC curve. In some cases, the first set of categorized data may include a first set of known malware files and known clean files, and the second set of categorized data may include a second set of known malware files and known clean files separate from the first set of known malware files and known clean files.

A computing device configured for optimizing computer detection of malware using pattern recognition by refreshing random classification forests is also described. The computing device may include a processor and memory in electronic communication with the processor. The memory may store computer executable instructions that when executed by the processor cause the processor to perform the steps of building a random forest with two or more binary decision trees based at least in part on a first set of categorized data, sending the random forest to a client device with a first random forest control value, identifying a second set of categorized data different from the first set of categorized data, calculating a second random forest control value based on the second set of categorized data and sending the second random forest control value to the client device.

A non-transitory computer-readable storage medium storing computer executable instructions is also described. When the instructions are executed by a processor, the execution of the instructions may cause the processor to perform the steps of building a random forest with two or more binary decision trees based at least in part on a first set of categorized data, sending the random forest to a client device with a first random forest control value, identifying a second set of categorized data different from the first set of categorized data, calculating a second random forest control value based on the second set of categorized data and sending the second random forest control value to the client device.

According to at least one embodiment, a method for optimizing computer detection of malware using pattern recognition by refreshing random classification forests is described. In one embodiment, a first random forest based at least in part on a first set of categorized data may be generated by a server. The first random forest may include N trees. An independent tree based at least in part on a second set of categorized data may be generated by the server. A second random forest may be generated by the server. The second random forest may include the independent tree and N-1 trees from the first random forest. A performance of the first random forest may be compared to a performance of the second random forest by the server. The independent tree may be sent to a client device based at least in part on the comparing by the server.

In some embodiments, the first random forest may be sent to the client device before generating the second random forest. Each tree of the first and second random forests may include N binary decision trees each with one or more leaf nodes. In some embodiments, a first receiver operating characteristic of the first random forest may be determined based on running at least a first random subset of the second set of categorized data down the first random forest. A second receiver operating characteristic of the second random forest may be determined based on running at least a second random subset of the second set of categorized data down the second random forest. The first receiver operating characteristics of the first random forest may be compared to the second receiver operating characteristics of the second random forest. comparing the first receiver operating characteristics of the first random forest to the second receiver operating characteristics of the second random forest. It may be determined to send the independent tree to the client device based at least in part on the first and second receiver operating characteristics indicating the second random forest outperforms the first random forest.

In some embodiments, the independent tree may be sent to the client device by the server. The client device may be instructed by the server to remove a selected tree from first random forest on the client device. The client device may be instructed by the server to implement the independent tree in the first random forest on the client device in place of the selected tree removed from the first random forest. In some embodiments, the first set of categorized data may include a first set of known malware files and a first set of known clean files. In some embodiments, the second set of categorized data may include a second set of known malware files and a second set of known clean files, the second set of categorized data may be different from the first set of categorized data. In some embodiments, the method may include performing a security action at the client device based on the first and second sets of categorized data.

A computing device configured for optimizing computer detection of malware using pattern recognition by refreshing random classification forests is also described. The computing device may include a processor and memory in electronic communication with the processor. The memory may store computer executable instructions that when executed by the processor cause the processor to perform the steps of building, by a server, a first random forest based at least in part on a first set of categorized data, the first random forest including N trees, generating, by the server, an independent tree based at least in part on a second set of categorized data, generating, by the server, a second random forest, the second random forest including the independent tree and N−1 trees from the first random forest, comparing, by the server, a performance of the first random forest to a performance of the second random forest, and sending, by the server, the independent tree to a client device based at least in part on the comparing.

A non-transitory computer-readable storage medium storing computer executable instructions is also described. When the instructions are executed by a processor, the execution of the instructions may cause the processor to perform the steps of building, by a server, a first random forest based at least in part on a first set of categorized data, the first random forest including N trees, generating, by the server, an independent tree based at least in part on a second set of categorized data, generating, by the server, a second random forest, the second random forest including the independent tree and N−1 trees from the first random forest, comparing, by the server, a performance of the first random forest to a performance of the second random forest, and sending, by the server, the independent tree to a client device based at least in part on the comparing.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
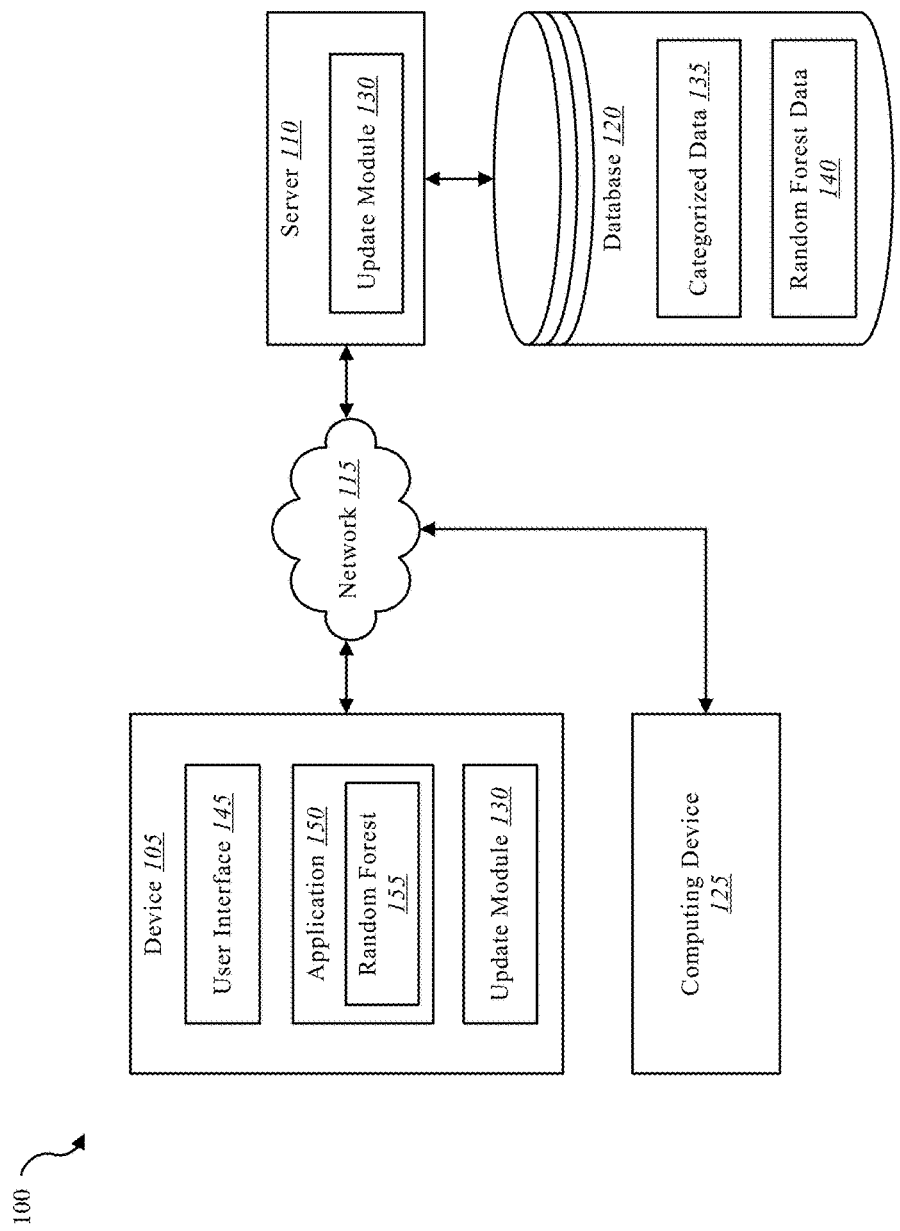
FIG. 1 is a block diagram illustrating one embodiment of an environment in which the present systems and methods may be implemented.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The systems and methods described herein relate to refreshing random forests. More specifically, the systems and methods described herein relate to refreshing random forests in relation to malware detection.

A random forest is machine-learning technique for classifying data. A random forest includes multiple decision trees configured to classify or sort data. By collecting multiple trees into a random forest, the random forest may correct for any individual tree's errors in classification. A random forest, and its trees, are created using supervised machine learning techniques. Decision trees are formed based on a known set of categorized data, sometimes called training data.

Malware detection programs or applications may use random forests to identify malware present on a computing device. Malware refers to software programs designed to damage or do other unwanted actions on a computer system. Common examples of malware may include viruses, worms, trojan horses, and spyware.

Over time, however, the random forest may become less effective at categorizing and/or sorting data (e.g., identifying malware on a computing system). Creators of malware are continually creating new types of malware, leveraging new ways to exploit computing systems, or developing new techniques to disguise malware. Because of the ever-changing nature of some data spaces, the ability of random forest to classify and sort data may decay over time. For example, a random forest may not be capable of detecting a new or novel malware threat that has emerged after the random forest was created.

In addition, it may be difficult to update random forests to account for the new malware threats. As new malware threats emerge, malware detection entities may update their data and their processes used to identify malware. Malware detection programs are deployed on millions of computing systems. Random forests may comprise many trees, and, consequently, a random forest may be a large file. Because of the file size of random forests, users of malware detection, generally, do not prefer to have their computing system processing power monopolized by frequent large updates to their malware detection program. As such, methods and apparatus for refreshing a random forest in a malware detection program using smaller, incremental updates are discussed.

In some examples, one or more selected trees of a random forest on a computing system may be replaced by one or more new trees. As new categorized data regarding new malware threats becomes available, one or more new trees may be generated using the new categorized data. Once the one or more new trees are available, the performance of the one or more new trees may be compared to the performance of the trees in the current random forest. Based on this comparison, one or more trees of the random forest may be selected to be replaced by one or more of the new trees.

In yet other examples, methods and apparatus for refreshing random forests may include updating the confidence scores of the trees of the random forest in addition to or as an alternative to replacing selected trees of the random forest with new trees.

Random forests or classification forests used to detect malware may decay over time as the data used to create the random forest ages. Replacing an entire random forest is an expensive operation due to limitations on malware definition update sizes. By using current categorized data to update aspects of an existing random forest, a currently implemented random forest may remain effective until it is replaced. For example, by updating the confidence scores of terminal nodes and the conviction threshold, the utilization period of an existing random forest may be prolonged. In some cases, updating the confidence scores and/or conviction threshold of a random forest may enable the existing random forest to approximate the efficacy of a newly grown random forest at a fraction of the updating costs.

In one embodiment, a first set of categorized data that includes definitions for malware and clean data may be used to build and train a random forest. Subsequent to deploying the random forest to one or more client devices, a new set of definitions for malware and clean data may be received as a second set of categorized data. In one embodiment, the first set of categorized data with updated classifications and the second set of categorized data may be run down the original random forest. A new confidence score may be determined for one or more terminal nodes of the random forest. Based on the new confidence scores, a new threshold of conviction may be determined in accordance with a desired true positive to false positive rate. The updated node confidence scores and/or conviction threshold may then be sent to and implemented on the client devices. Sending only the updated confidence scores and/or conviction threshold to the clients is a relatively small and quick update compared to building and sending an entirely new random forest to clients.

FIG. 1 is a block diagram illustrating one embodiment of an environment 100 in which the present systems and methods may be implemented. In some embodiments, the systems and methods described herein may be performed on a device (e.g., device 105) and/or a server (e.g., server 110). As depicted, the environment 100 may include a device 105, a server 110, and a computing device 125 communicatively coupled via a network 115.

The device 105 may be any device that utilizes a random forest to classify or sort data. For example, the device 105 may use a random forest to identify and detect malware present on the device 105. In some configurations, the device 105 may include a user interface 145, an application 150, and an update module 130. The user interface 145 may include any number of input/output devices such as, for example, a mouse, keyboard, audio speakers, a display, a touchscreen, or other ways to interact with a user. The application 150 may be installed on the computing device 125 in order to allow a user to interface with a function of the device 105, the update module 130, and/or the server 110. The application 150 may include a random forest 155 and may be embodied as any application that utilizes the random forest 155. In some embodiments, the application 150 may be embodied as a malware detection application. The update module 130 is configured to communicate with the server 110 to determine whether the application 150 may need new or additional information to operate. For examples, the update module 130 may be configured to receive updates to the random forest 155. Although the components of the device 105 are depicted as being internal to the device 105, it is understood that one or more of the components may be external to the device 105 and connect to device 105 through wired and/or wireless connections. The device 105 may include any combination of mobile devices, smart phones, personal computing devices, computers, laptops, desktops, servers, media content set top boxes, satellite set top boxes, cable set top boxes, DVRs, personal video recorders (PVRs), etc.

The server 110 may be any computing system that generates, manages, or stores a random forest to classify or sort data. In some embodiments, the server 110 generates, manages, or stores, random forests for a plurality of other computing systems such as, for example, the device 105 or the computing device 125. In the illustrative embodiment, the server 110 includes an update module 130 configured to refresh the random forests deployed on the device 105 and the computing device 125. Examples of the server 110 may include any combination of a data server, a cloud server, a server associated with an automation service provider, proxy server, mail server, web server, application server, database server, communications server, file server, home server, mobile server, name server, etc.

The update module 130 may enable the server 110 to generate decision trees, generate random forests, compare the performance of different trees and/or the performance of different random forests, and generate updates to the trees and/or random forests. In some embodiments, the update module 130 may be configured to perform the systems and methods described herein in conjunction with the device 105 and/or the computing device 125. Further details regarding the update module 130 are discussed below with reference to FIG. 2.

In some embodiments, server 110 may be coupled to a database 120. Database 120 may be internal or external to the server 110. The database 120 may include categorized data 135 and random forest data 140. The categorized data 135 may be a set of known data that may be used to discover potentially predictive relationships between the data. In some embodiments, the categorized data 135 may be ground truth data indicative of information provided by direction observations. The random forest data 140 may be any data related to any number of random forests used by the update module 130. For example, the random forest data 140 may include data about trees, leaf nodes, confidence scores, random forests, or other related information.

In some examples, the device 105 may be coupled directly to the database 120, and the database 120 may be internal or external to the device 105. For example, device 105 may access the categorized data 135 or random forest data 140 in the database 120 over the network 115 via the server 110.

The computing device 125 may be any devices that utilize a random forest to classify data. For example, the computing device 125 may use a random forest to identify and detect malware present on their systems. In some configurations, the computing device 125 may provide categorized data 135 to the server 110, or data that may be transformed into categorized data 135 by the server 110. Examples of computing device 125 may include any combination of a mobile computing device, a laptop, a desktop, a server, a media set top box, etc. In some embodiments, the device 105 and the computing device 125 may cooperate to provide the server 110 with additional data about malware threats to computing systems. For example, as novel malware threats emerge, the device 105 and/or the computing device 125 may provide information to the server 110 that aids in the identification and the detection of such novel malware threats.

In some embodiments, the server 110 may communicate with the device 105 and/or the computing device 125 via the network 115. Examples of the network 115 may include any combination of cloud networks, local area networks (LAN), wide area networks (WAN), virtual private networks (VPN), wireless networks (using 802.11, for example), cellular networks (using 3G and/or LTE, for example), etc. In some configurations, the network 115 may include the Internet. It is noted that in some embodiments, the server 110 may not include the update module 130. In such examples, the server 110 may communicate with the update module 130 located on another device (e.g., device 105 or the computing device 125) via the network 115. In some embodiments, device 105, the server 110, and the computing device 125 may include update module 130 where at least a portion of the functions of the update module 130 are performed separately and/or concurrently on the device 105, one or more of the computing device 125, and/or the server 110.

Figure 2:
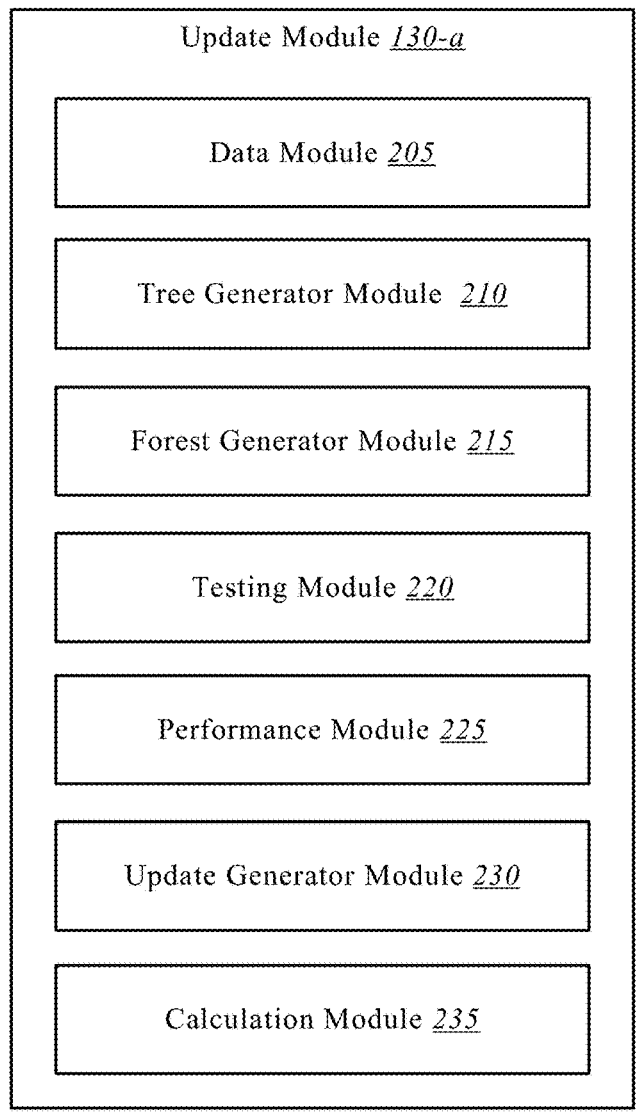
FIG. 2 is a block diagram illustrating one example of an update module.

FIG. 2 is a block diagram illustrating one example of an update module 130-*a*. The update module 130-*a* may be an example of the update module 130 depicted in FIG. 1. The update module 130-*a* may include a data module 205, a tree generator module 210, a forest generator module 215, a testing module 220, a performance module 225, an update generator module 230, and a calculation module 235.

The data module 205 may be configured to receive, process, and/or store categorized data. Before building any trees or random forests using supervised machine-learning techniques, categorized data is obtained. Categorized data includes data with a set of known attributes. For example, in the field of malware detection, categorized data may include a set of both clean files (e.g., files that do not include malware) and corrupted files (e.g., files that do include malware). In some embodiments, the data module 205 receives categorized data from the device 105, the computing device 125, and/or other sources such as, for example, entities tasked with classifying data in the manner desired. The data module 205 may continually receive new data and may be continually developing new categorized data with that new data. For example, the device 105 and computing device 125 may transmit the data about various files to the server 110. The data module 205 may analyze the data and determine whether a novel malware threat exists. If such a novel malware threat is confirmed, the data module 205 may add the file with the malware to the categorized data 135. Alternatively, the data module 205 may also add clean files to the categorized data 135. In some embodiments, the data module 205 may discard some categorized data based at least in part on the age of the categorized data or other indicators that the categorized data is not useful to classify other data any longer. In some configurations, the data module 205 generates ground truth data, which is based on direct observations of desired events and not on inferences.

The tree generator module 210 may be configured to generate decision trees to classify data based at least in part on relationships identified in the categorized data set. A decision tree (i.e., a tree) accepts unclassified data, traverses the unclassified data through a plurality of decision points (i.e., branch nodes) to divide the unclassified data into smaller and smaller sets. Finally, the decision tree classifies each piece of information in the unclassified data based on which classification bucket (i.e., leaf or terminal node) the information terminates. In some embodiments, there are two types of decision trees, a classification tree having discrete classification buckets and a regression trees having continuous classification variables.

As described above, in one embodiment, update module 130-*a* may perform a forest returning procedure to update at least one aspect of a random forest already installed on a client device. For example, forest generator module 215 may be configured to build a random forest. In some embodiments, the random forest may include a preconfigured number N of binary decision trees. In some embodiments, N may be any value greater than or equal to 2. In one embodiment, forest generator module 215 may randomly select a test condition for each node of the N binary decision trees of the random forest. For example, one or more of the N binary decision trees may include at least a root node and two leaf or terminal nodes. Additionally, in some cases, one or more of the N binary decision trees may include one or more branch or intermediary nodes in addition to a root node and leaf nodes. Accordingly, in some embodiments, forest generator module 215 may randomly select a test condition for each root, branch, and/or leaf node for each of the N binary decision trees of the random forest. In some cases, the test condition may relate to malware file characteristics. For example, the randomly selected test condition for each node may be based on at least one of filename, file size, file type, file metadata, file header, file creation date, file owner, file creator, file read-only setting, hidden file setting, file encryption information, file compression information, and an identified pattern of data contained in a file.

In some cases, the forest generator module 215 may build a random forest based at least in part on a first set of categorized data. In some embodiments, forest generator module 215 may be configured to select N random subsets of data from the first set of categorized data and assign one of the N random subsets of data to one of the N binary decision trees of the random forest. In some cases, forest generator module 215 may run a random subset of the first set of categorized data down each of the N binary decision trees of the random forest. In some embodiments, each random subset may include data that is unique to each binary decision tree. In some configurations, forest generator module 215 may assign each of the N random subsets of data exclusively to one of the N binary decision trees, one random subset per binary decision tree.

As one example, the first set of categorized data may include values 1, 2, 3, 4, 5, 6, 7, 8, 9, 10, 11, 12, 13, 14, 15, 16, 17, 18, 19, 20. The values may represent data values, files, data in files, or any combination thereof. Forest generator module 215 may randomly select values 1, 5, 9, 13, 17 as a first random subset of the first set of categorized data, randomly select values 3, 8, 10, 17, 19 as a second random subset of the first set of categorized data, and so forth until N random subsets are selected. Accordingly, forest generator module 215 may run each of the first random subset values 1, 5, 9, 13, 17 down a first binary decision tree of the N binary decision trees. The first binary decision tree may include a root node with a test condition of whether a value is greater than or equal to 7, as one example. Accordingly, forest generator module 215 running the first random subset of values down the first binary tree may include the root node of the first binary tree indicating false for values 1 and 5, and true for values 9, 13, and 17. This process may continue based on test conditions for any branch or intermediary nodes and end upon reaching a leaf or terminal node of the first binary tree. Likewise, forest generator module 215 may run each of the second random subset values 3, 8, 10, 17, 19 down a second binary decision tree of the N binary decision trees, and so on with each binary decision tree until a randomly selected subset of the data is run down each of the N binary decision trees. In some embodiments, each random subset may include the same number of files or data points. For example, if the first set of categorized data includes a certain number of files, then each randomly selected subset may include the same number of files. Alternatively, at least one of the random subsets may include more or less files/data points than another random subset.

In some embodiments, the first set of categorized data may include data categorized as malware and data categorized as clean or free from malware. In some cases, the first set of categorized data may include malware files and clean files. Thus, in some cases, each unique random subset of the first set of categorized data may include a random subset of the malware files and/or a random subset of the clean files. In some cases, a number of malware files in a random subset may equal a number of cleans files in the random subset for at least one of the N random subsets of the first set of categorized data. For example, if a first random subset includes 3 malware files, then the first random subset may include 3 clean files for a total of 6 files. Alternatively, a random subset may include more or less malware files than clean files.

In some embodiments, data module 205 may be configured to identify a second set of categorized data different from the first set of categorized data. For example, the data module 205 may categorize a first set of data and then categorize a second set of data after categorizing the first set of data. Accordingly, the data module 205 may generate the first set of categorized data based on categorizing the first set of data and then generate the second set of categorized data based on categorizing the second set of data. In some cases, both the first and second sets of data may include malware files and clean files. Accordingly, in some configurations, data module 205 may identify the first set of categorized data based on a first set of known malware files and known clean files. Likewise, data module 205 may identify the second set of categorized data a second set of known malware files and known clean files that are different from the first set of known malware files and known clean files.

In some embodiments, update generator module 230 may be configured to send the random forest to a client device. On the client device, the random forest may be implemented to test unknown files to determine whether they are more or less likely to include malware. In some cases, the update generator module 230 may send to the client device a first random forest control value with the random forest. In some cases, the first random forest control value may include one or more confidence scores for leaf nodes of the binary decision trees of the random forest, a threshold of conviction for the random forest, or any combination thereof. Thus, in some embodiments, the update generator module 230 may send to the client device one or more confidence scores and/or a first threshold of conviction with the random forest.

In some embodiments, data module 205 may calculate the first random forest control value based on analysis of the first set of categorized data. Likewise, in some embodiments, data module 205 may calculate a second random forest control value based on analysis of the second set of categorized data. In some cases, the update generator module 230 may be configured to send the second random forest control value to the client device. In some cases, the second random forest control value may replace the first random forest control value on the client device. The random forest may first be implemented on the client device using the first random forest control value. After receiving the second random forest control value, the second random forest control value may replace the first random forest control value and the random forest may be implemented on the client device using the second random forest control value instead of the first random forest control value.

In some cases, a security action may be performed on the client device in conjunction with implementing the first and/or second random forest control value in the random forest on the client device. In some embodiments, the update generator module 230 may generate an update that also includes instructions for the client device to perform one or more security actions based at least in part on the first categorized data and the second categorized data. As used herein, the term "security action" may refer to any number of actions the systems described herein may take after determining that a file likely includes some type of malware. For example, types of security actions may include preventing the file from performing any actions on the computing device, alerting an administrator to the potential maliciousness of the file, quarantine the file, delete the file, block a download of the file, and/or warn a user about the file. In addition, the systems described herein may perform a security action on objects other than a file. For example, the systems described herein may blacklist malicious URLs and/or IP addresses. It should be appreciated that these are not exhaustive lists of the types of security actions which may be performed by the systems described herein. Other security actions are also included in this disclosure.

In some embodiments, the second set of categorized data may include new definitions of data related to malware data samples and clean data samples. The second set of categorized data may provide the random forest further clarification and confidence in classifying unknown files as malware files or clean files. Thus, implementing the second random forest control value in the random forest may improve the operation of the random forest already on the client without having to replace the entire random forest. Thus, generating only the second random forest control value instead of generating an entirely new random forest based on the second set of categorized data may improve system response time and efficiency because generating a second random forest control value takes less resources and time than generating an entirely new random forest. Also, a random forest control value may be one or more orders of magnitude smaller byte-wise than a random forest. Thus, sending only the second random forest control value to the client instead of an entirely new random forest may save on network bandwidth.

In some embodiments, calculation module 235 may calculate a set of confidence scores in relation to the random forest. In some embodiments, running the random subsets of the first set of categorized data down the random forest may result in confidence scores being determined for each leaf node of the random forest. For example, confidence scores may be based on the effectiveness of a node of the binary decision tree correctly classifying a file or data point tested at the particular node. In some embodiments, calculation module 235 may calculate a confidence score for each leaf node of the random forest based at least in part on running data through the random forest. For instance, calculation module 235 may calculate the first confidence scores by running at least a subset of the first set of categorized data for each binary decision tree of the random forest. Similarly, calculation module 235 may calculate second confidence scores by running at least a subset of a second set of categorized data for each binary decision tree of the random forest. As one example, a random subset of data run down a binary decision tree may include 3 known malware files and 3 known clean files. If a leaf node of the binary decision tree results in an indication that 2 of the known malware files contain malware, and the 3 known clean files and one of the known malware files are free of malware, then the binary decision tree correctly classifies 5 out of the 6 files. Thus, the confidence score associated with the binary decision tree may indicate a confidence of 5 out of 6 files being correctly classified, or a confidence score of 0.83.

In some embodiments, calculation module 235 may calculate one or more random forest control values. The random forest control values may include confidence scores for one or more leaf nodes of at least one binary decision tree of the random forest, a conviction threshold for the random forest, or any combination thereof. As one example, calculation module 235 may calculate a threshold of conviction for a given set of categorized data. For example, calculation module 235 may calculate a first threshold of conviction based on the first set of categorized data and calculate a second threshold of conviction based on the second set of categorized data. In one embodiment, satisfying the threshold of conviction may determine whether an unknown file is more likely to include malware or to be free from malware. In some cases, the threshold of conviction may be associated with confidence scores of the binary decision trees of the random forest determined by running a set of categorized data down the binary decision trees of the random forest. In one embodiment, calculating the first threshold of conviction for the random forest may be based at least in part on an aggregate of the first set of confidence scores. Likewise, calculating the second threshold of conviction may be based at least in part on an aggregate of the second set of confidence scores. For example, calculating a conviction threshold may be based at least in part on calculation module 235 calculating a summation and/or an average of confidence scores derived from running categorized data through the binary decision trees of the random forest.

In some cases, calculating the first threshold of conviction may include calculation module 235 calculating true positive and false positive rates for each leaf node of the random forest in conjunction with running the random subsets of the first set of categorized data down the random forest. In some configurations, calculating the second threshold of conviction may include calculation module 235 calculating true positive and false positive rates for each leaf node of the random forest in conjunction with running the random subsets of the second set of categorized data down the random forest. In some embodiments, data module 205 may generate a receiver operating characteristic (ROC) curve based on the calculated true positive and false positive rates of each leaf node. In some cases, data module 205 may select a value along the ROC curve in relation to selecting the first and/or second conviction thresholds.

As one example, where N=3 binary decision trees, the first conviction threshold may be calculated based on test data (first or second set of categorized data, for example) ran through the random forest. The test data being ran through the 3 binary decision trees may result in the first binary decision tree having a confidence score of 0.94, the second binary decision tree with a confidence score of 0.86, and the third binary decision tree with a confidence score of 0.91. Summing these confidence scores may indicate a summation-based threshold of conviction of 2.71. Averaging these confidence scores may indicate an average-based threshold of conviction of 0.903. Accordingly, the random forest may be sent with the confidence scores and/or conviction of threshold to a client device. The client device may implement the random forest to test unknown files. For instance, an unknown file associated with the client device may be run down the random forest to determine whether the unknown file is most likely a malware file or a clean file free from malware. In some embodiments, the forest generator module 215 may run the unknown file down each of the 3 binary decision tree of the random forest. As a result, the unknown file may be scored by each binary decision tree. The first binary decision tree with a confidence score of 0.94 may give the unknown file a score of 0.92, the second binary decision tree with a confidence score of 0.86 may give the unknown file a score of 0.89, and the third binary decision tree with a confidence score of 0.91 may give the unknown file a score of 0.93. Since the unknown file scored below the confidence score of the first binary decision tree, the first binary decision tree may indicate the unknown file does not include malware. However, since the unknown file scored above the confidence score of the second and third binary decision trees, the second and third binary decision trees may indicate the unknown file does include malware. In one embodiment, the scores of the unknown file by each of 3 binary decision trees may be summed and/or averaged and then compared to the first threshold of conviction to determine whether to convict the file as containing malware or indicate the file is clean and free from malware. For instance, the scores of 0.92, 0.89, and 0.93 may be summed resulting in a summed-score of 2.74 for the unknown file. Compared to the summation-based threshold of conviction of 2.71, the summed score of 2.74 may indicate the unknown file includes malware. In one embodiment, the scores of the unknown file may be averaged resulting in an average score of 0.913 for the unknown file. Compared to the average-based threshold of conviction of 0.903, the average score of 0.913 may indicate the unknown file includes malware. Although the conviction of threshold is explained here as indicating malware when a score of an unknown file exceeds a given threshold, in some embodiments, an unknown file may be categorized as including malware when a score of the unknown file does not exceed a given threshold.

In one embodiment, calculation module 235 may be configured to calculate a second threshold of conviction for the random forest based at least in part on running a second set of categorized data down the random forest. Accordingly, in some embodiments, update generator module 230 may be configured to send the second threshold of conviction to the client device and/or any combination of a second set of confidence scores calculated by calculation module 235 in association with running the second set of categorized data down the random forest.

In some embodiments, forest generator module 215 may be configured to implement the second set of confidence scores and/or the second threshold of conviction in the random forest already installed on the client device. In some cases, forest generator module 215 may replace, on the client device, the first set of confidence scores with the second set of confidence scores. Additionally, or alternatively, forest generator module 215 may replace, on the client device, the first threshold of conviction with the second threshold of conviction. In some cases, forest generator module 215 may send a command and/or instructions to the client device to implement the second set of confidence scores and/or the second threshold of conviction in relation to the random forest on the client device. Additionally, or alternatively, forest generator module 215 may execute, via a connection with client device, a command and/or a process on the client device to implement the second set of confidence scores and/or the second threshold of conviction. For instance, forest generator module 215 may establish a secure connection with the client device to implement the second set of confidence scores and/or the second threshold of conviction.

Figure 3:
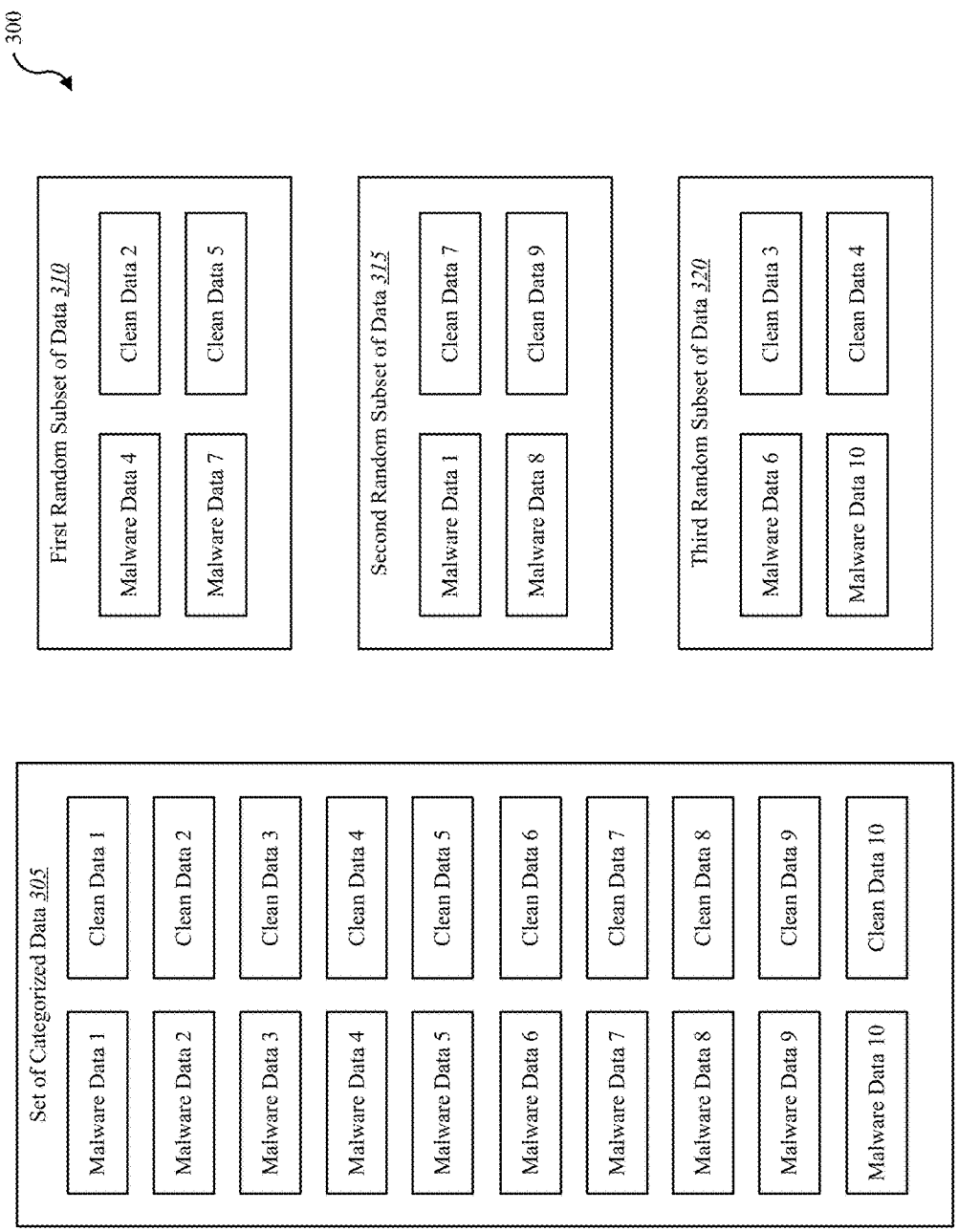
FIG. 3 is a block diagram illustrating one example of a random subset of a set of categorized data.

FIG. 3 is a block diagram 300 illustrating one example of random subsets of data from a set of categorized data. As illustrated, block diagram 300 illustrates a set of categorized data 305, first random subset of data 310, second random subset of data 315, and third random subset of data 320. In one embodiment, the set of categorized data 305 may include a set of malware data and a set of clean data. As shown, the malware data set may include malware data 1 to malware data 10, and clean data set may include clean data 1 to clean data 10.

The malware data set may depict malware files, malware data, or a set of malware data. As one example, malware data 1 may represent a malware file, malware related data, a malware data point, a malware related value, or any combination thereof. Although the malware data set is depicted as being equal in number to the clean data set, in some embodiments, the set of categorized data 305 may include more or less files in the malware data set than files in the clean data set.

In one embodiment, data module 205 may generate the first random subset of data 310 by randomly selecting a set of files from the set of categorized data 305. As shown, data module 205 may randomly select malware data 4, malware data 7, clean data 2, and clean data 5. Similarly, data module 205 may generate second random subset of data 315 and third random subset of data 320 by randomly selecting data from the malware set and/or clean set files. Although each random subset 310, 315, and 320 is depicted as having an equal number of files from the set of categorized data 305, in some embodiments, at least one of the random subsets may include more or less files than another of the random subsets. Additionally, or alternatively, although each random subset 310, 315, and 320 is depicted as having an equal number of malware files to clean files, in some cases, at least one of the random subsets 310, 315, and 320 may include more or less malware files than clean files.

Figure 4:
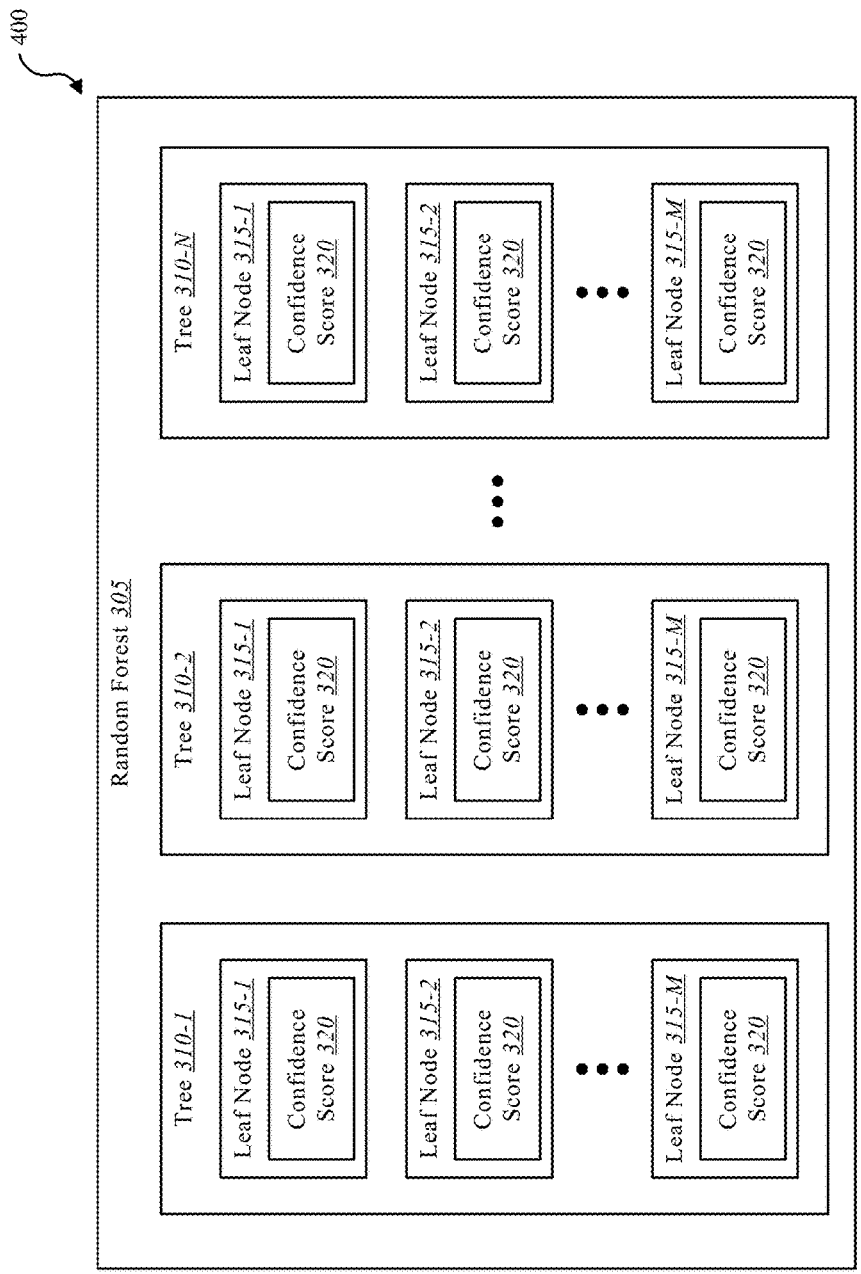
FIG. 4 is a block diagram illustrating one example of a random forest.

FIG. 4 is a block diagram illustrating one example of a random forest 405 comprised of N number of trees 410. The random forest 405 may be an example of the random forest 155 depicted in FIG. 1. As depicted, a tree 410-1 includes an M number of leaf nodes 415-M. Each leaf node 415 represents a terminal node of the tree 410-1. Terminal nodes represent the final outcome of the classification process performed by the tree 410-1. In some embodiments, each leaf node 415 indicates that the data that arrives at the leaf node 415 belongs in a particular class. Each leaf node 415 includes a confidence score 420 indicative of a probability that the data items in the leaf node 415 belong to the particular class indicated by the leaf node 415. For example, if a leaf node 415 with a confidence score of 80% indicates that a file includes malware, the probability that the file actually includes malware is 80%. Confidence scores 420 may be determined using the categorized data 135. Because the categorized data 135 includes data that has already been classified, after the decision has been formed, a system may compare the leaf node's classification against the pre-determined, known classification. In such a case, the tree 410-1 may have sorted five pieces of data into a particular leaf node 415-1 that indicates the five pieces of data belong in a first classification. If the pre-determined classification indicates that four of the five belong in the first classification, the confidence score 420 of the leaf node 415-1 may be 80%. Please note that branch nodes are not depicted in FIG. 4. Branch nodes are intermediary decision points that separate unclassified data into smaller sets, but do not classify the data.

Returning to FIG. 2, the tree generator module 210 may build a plurality of trees 410 to be included in a random forest 405. The tree generator module 210 receives the categorized data 135 generated by the data module 205. The tree generator module 210 selects a subset of the categorized data with which to build a particular tree 410-1. In some embodiments, each tree 410-N is built using a different subset of the categorized data 135. In some embodiment, each tree 410-N is built using a random or pseudo-random subset of the categorized data 135. When separating the subset of categorized data (e.g., at branch nodes and/or leaf nodes 415), the tree generator module 210 may select of subset of variables from a set of variables on which to base the separation. In some examples, each decision point is made using a different subset of variables. In some examples, an entire tree is built using the same subset of variables.

In some examples, the tree generator module 210 may terminate the building of a tree 410 after either: (i) the subset of categorized data 135 cannot be split again, (ii) the tree 410 has gone as deep as it can go based at least in part on the categorized data and the variables used to make decisions, and (iii) the tree 410 has reached a pre-determined number of leaf nodes 415-M. In some examples, the tree generator module 210 will terminate when a tree 410-1 has reached a pre-determined number of leaf nodes 415-M. In this way, the file size of each tree 410-N in the random forest 405 may be roughly equivalent to the file sizes of the other trees 410 in the random forest 405. Having trees of roughly equivalent files sizes may allow for updates that refresh a random forest (e.g., re-tuning or tree replacement or both) to be a predictable file size.

The forest generator module 215 may be configured to generate a random forest from at least a subset of the trees 410 generated by the tree generator module 210. A random forest 405 is built with the assumptions that most trees 410 in a random forest 405 are accurate predictors/classifiers of the categorized data and different trees 410 will make classification mistakes at different places. To account for any bias that may be found in a single decision tree 410, a random forest 405 is a collection of trees 410 built to classify the same or similar types of data. By combining the classification results of multiple trees, in theory, a random forest 405 may be a more accurate predictor/classifier of the data than any tree 410 alone. In some examples, the random forest 405 includes all of the trees 410 generated by the tree generator module 210. In some examples, the random forest 405 includes a subset of the trees generated by the tree generator module 210. The subset of trees 410 included in the random forest 405 may be determined based at least in part on the performances of the trees 410 generated by the tree generator module 210.

The testing module 220 may be configured to determine whether a random forest should be updated or refreshed based on new, additional, or updated categorized data. In some configurations, the testing module 220 may determine a sufficient amount of new categorized data has been obtained. Once a sufficient amount of new categorized data has been obtained, the testing module 220 determines whether the random forest 405 should be updated. The testing module 220 may determine that an update is required by running new categorized data through the random forest 405 and/or one or trees 410 of the random forest 405. Comparing the classification results of the new categorized data against the pre-determined classifications of the new categorized data. The testing module 220 may generate an overall performance parameter based at least in part on the comparison of the classification results to the new categorized data. By comparing the overall performance parameter to an overall performance threshold, the testing module 220 may determine that an update is required. If the overall performance parameter exceeds a performance threshold, an update may be advisable. In some configurations, testing module 220 may determine that it should evaluate whether the random forest 405 should be updated at a pre-determined time interval (e.g., once a day, once a week, or once a month). In some configurations, the testing module 220 may perform an update procedure at a pre-determined time interval, without comparing the overall performance parameter to the overall performance threshold.

In some examples, the new categorized data is different than the categorized data 135 used to generate the random forest 405 and/or one or more of the trees 410 of the random forest 405, where at least some of the new categorized data was not used to generate the random forest 405. In some embodiments, the new categorized data includes at least some of the categorized data 135 used to generate the random forest 405. In some embodiments, the random forest 405 may be built using many different iterations of categorized data 135, and the new categorized data may include at least part of some of the many different iterations of categorized data 135.

As already discussed, a performance of the random forest 405 may decay over time because of the changing nature of the data being classified. For example, when detecting malware, the types of malware are always changing, and, therefore, methods to detect malware may also be updated to account for new threats. After an amount of time has passed, the update module 130 may receive and process new information that may be used as new categorized data. The new categorized data being new relative to the categorized data 135 used to generate the random forest 405.

Once the testing module 220 determines that an update procedure should be performed, in some configurations, the testing module 220 may determine which type of update procedure should be performed. For example, the testing module 220 may determine that a re-tuning of the random forest 405 may be done, that a new tree should be generated, that both re-tuning and a new tree should be generated, or some other type of random forest 405 refreshing method should be used. In some configurations, the testing module 220 may provide instructions to the tree generator module 210 or the forest generator module 215 to determine new confidence scores 420 for the random forest 405 based at least in part on the new categorized data (e.g., as part of a re-tuning operation). In yet other configurations, the testing module 220 may provide instructions to the tree generator module 210 to generate an independent tree 425 based at least in part on the new categorized data.

The performance module 225 may be configured to determine the performance of individual trees and/or the performance of entire random forests as part of a refreshing procedure. As used in this application, performance refers to the ability of tree(s) 410 or random forest(s) 405 to classify correctly the data. For example, before building a tree 410 or a random forest 405, another entity (e.g., a human) may determine a classification for each piece of information in the categorized data. By comparing the pre-determined classification, to the classification determined by the tree or the random forest, the performance of the tree or the random forest may be determined.

In some configurations, the performance module 225 may compare a performance of the independent tree 425 to a performance of the random forest 405. For discussion purposes, the random forest 405 discussed above may also be referred as the original random forest 405-1 and a plurality of other unique random forests may be referred as the unique random forests 405-K. The original random forest 405-1 is a random forest that was made using the categorized data 135. In some cases, the original random forest 405-1 may be in use by the device 105 and the computing device 125 when the independent tree 425 is generated.

In some embodiments, the performance module 225 may compare the performance of the independent tree 425 to the performance of the original random forest 405-1 by generating a plurality of random forests and the comparing the performances of those random forests. In this example, the performance module 225 may generate this comparison by generating a plurality of the unique random forests 405-K. The illustrative embodiment, each unique random forest 405-K will include the same number of trees as the original random forest 405-1. Each unique random forest 405-K may comprise N number of trees 410, where the N number of trees include the independent tree 425 and N−1 trees 410 selected from the original random forest 405-1. In some configurations, the performance module 225 may generate N number of unique random forests 405-K. In this configuration, each unique random forest 405-K includes a unique subset of trees 410 selected from the independent tree 425 and the trees 410-N included in the original random forest 405. The unique random forests 405-K may be generated by replacing a different tree 410 of the original random forest 405-1 with the independent tree 425. For example, a first unique random forest may include the independent tree 425 and trees 410-2 through 410-N of the original random forest 405-1; a second unique random forest may include the independent tree 425, tree 410-1 and trees 410-3 through 410-N; and etc. In other embodiments, however, the plurality of unique random forests 405-K may include a number of trees different than the original random forest 405-1. For example, the plurality of unique random forests 405-K may include more than one independent tree generated from the new categorized data or the unique random forests 405-K may include any number of trees selected from the original random forest 405-1.

To compare the performances of the original random forest 405-1 and the plurality of unique random forests 405-K, the performance module 225 may run the new categorized data through each of the random forests 405-1, 405-K. In some examples, the performance module 225 may generate a receiver operating characteristic (ROC), or ROC curve, for each random forest 405-1, 405-K based at least in part on the new categorized data. The performance module 225 may generate a performance parameter based on the ROC curves for each random forest 405-1, 405-K. The performance module 225 may be used to determine which random forest 405-1, 405-K performed better than the other random forests 405-1, 405-K. For example, the performance module 225 may compare the performance parameters to determine which random forest is the top-performer. If the original random forest 405-1 is not the top-performer, the performance module 225 may identify a selected tree 430 from the original random forest 405-1 to replace with the independent tree 425. In some examples, the selected tree 430 is identified by determining which tree 410-N of the original random forest 405-1 is not included in the top-performing unique random forest 405-K. In some embodiments, the performance module 225 may use one or more different methods to compare the performances of the random forests 405-1, 405-K.

The update generator module 230 may be configured to generate an update that refreshes the random forest 405 being operated by the device 105 and/or the computing device 125. If the update module 130-a performed a re-retuning procedure, the update may include instructions to replace the confidence scores 420 with new confidence scores 420 for the random forest 405. If the update module 130-a performed a tree replacement procedure, the update may include instructions to replace the selected tree 430 with the independent tree 425 in the random forest 405. In some configurations, the update may include instructions for both re-tuning updates and tree replacement updates. The instructions included in the update are configured to be executable by any device that uses the random forest 405, for example, the device 105 and the computing device 125.

Figure 5:
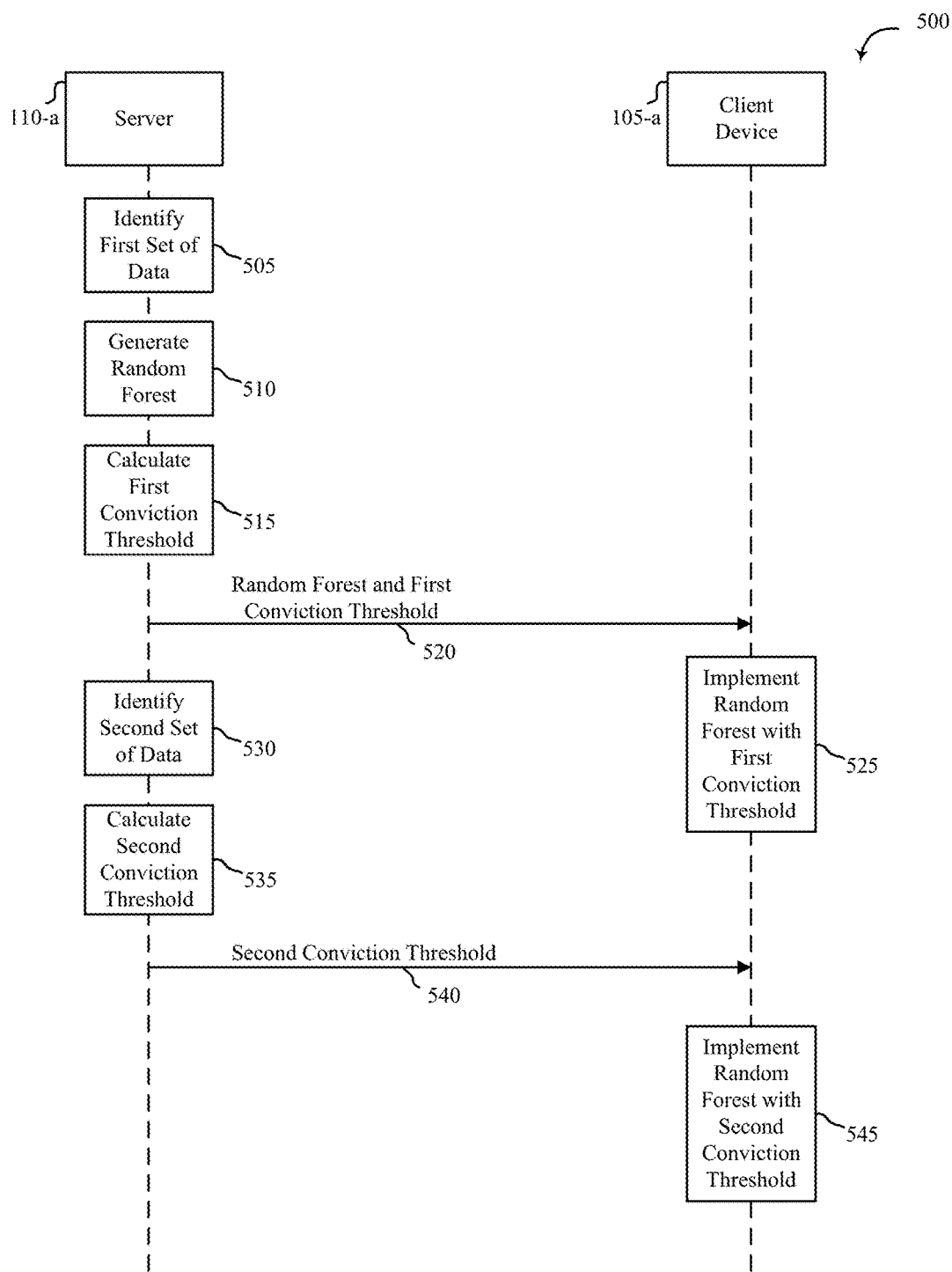
FIG. 5 shows a diagram of a device communication chart in accordance with various aspects of this disclosure.

FIG. 5 shows a diagram of a device communication chart 500 in accordance with various aspects of this disclosure. As depicted, the device communication chart 500 may include server 110-a and client device 105-a, which may be examples of server 110 and device 105 of FIG. 1, respectively.

As shown, at block 505, server 110-a may identify a first set of data. The first set of data may include data categorized as malware and clean. For example, the first set of data may include known malware files and known clean files. At block 510, server 110-a may generate a random forest based on the first set of data. For example, at least a subset of the first set of data may be used to train the random forest and/or determine confidence scores for binary decision trees of the random forest.

At block 515, server 110-a may calculate a first conviction threshold based on the first set of data being ran through the random forest. At communication 520, server 110-a may send the random forest and/or the first conviction threshold to the client device 105-a. At 525, client device 105-a may implement the random forest with the first conviction threshold. For example, client device 105-a may identify an unknown file and run the unknown file through the random forest to classify the unknown file as malware or clean.

At block 530, server 110-a may identify a second set of data. In one embodiment, the second set of data may include a set of known malware files and clean files different from the files from the first set of data. At block 535, server 110-a may calculate a second conviction threshold based on running at least a subset of the second set of data through the random forest. At communication 540, server 110-a may send the second conviction threshold 540 to the client device 105-a. At block 545, client device 105-a may implement the random forest received at communication 520 with the second conviction threshold. For example, in one embodiment, client device 105-a may replace the first conviction threshold with the second conviction threshold after receiving the second conviction threshold via communication 540 from server 110-a. Thus, in some embodiments, client device 105-a may identify an unknown file after implementing the second conviction threshold in the random forest received at communication 520 in order to classify the unknown file as malware or as being clean.

Figure 6:
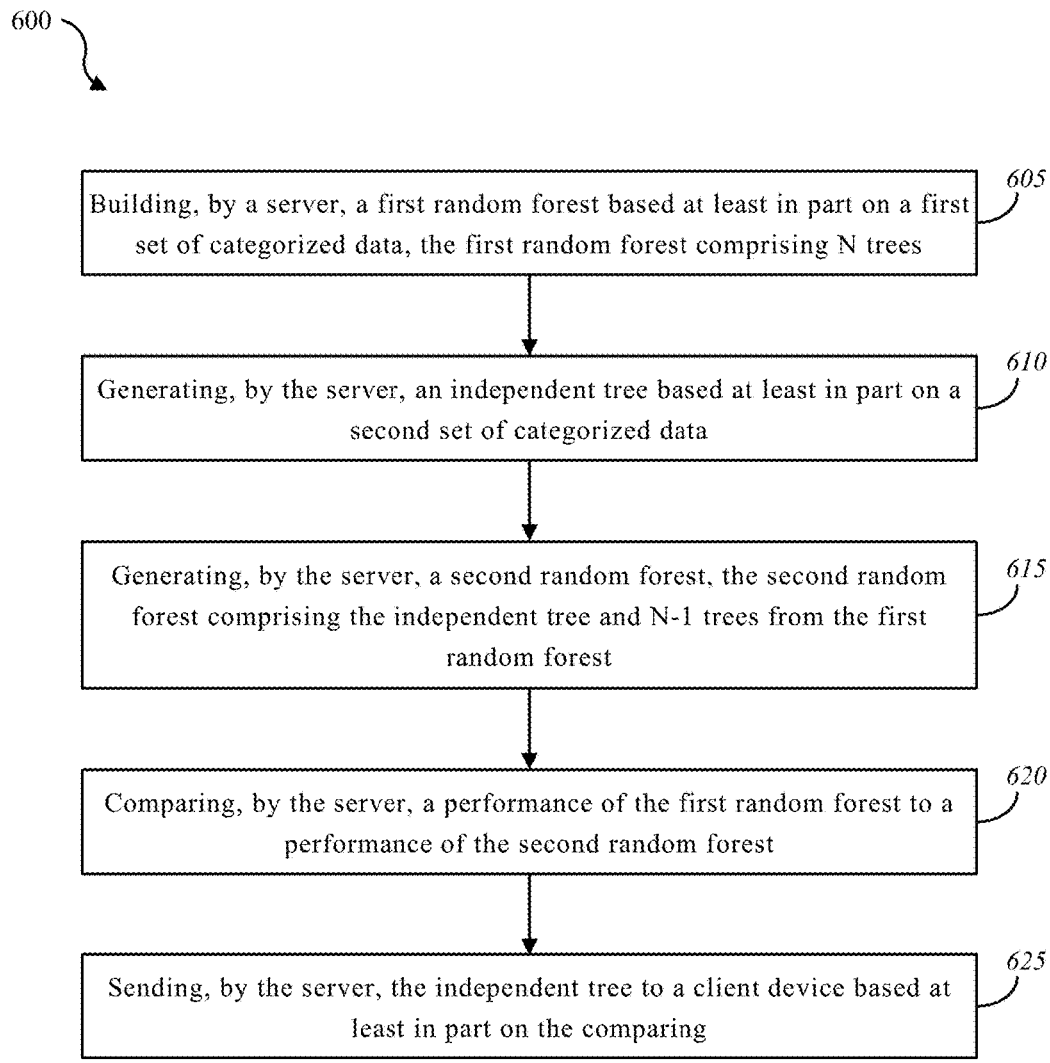
FIG. 6 is a flow diagram illustrating one embodiment of a method of refreshing random forests.

FIG. 6 is a flow diagram illustrating one embodiment of a method 600 for refreshing a random forest. In some configurations, the method 600 may be implemented by the update module 130 illustrated in FIG. 1 or 2. In some configurations, the method 600 may be implemented in conjunction with the application 150, the user interface 145, and/or the update module 130 illustrated in FIG. 1.

At block 605, the method 600 may build, by a server, a first random forest based at least in part on a first set of categorized data, the first random forest comprising N trees. In some cases, the original random forest is the first random forest. In some cases, the method 600 may send, by the server, the first random forest to the client device before generating the second random forest, each tree of the first and second random forests comprising N binary decision trees each with one or more leaf nodes. In some cases, the method 600 may identify, by the server, the first set of categorized data comprising a first set of known malware files and a first set of known clean files, and identify, by the server, the second set of categorized data comprising a second set of known malware files and a second set of known clean files, the second set of categorized data being different from the first set of categorized data.

At block 610, the method 600 may generate, by the server, an independent tree based at least in part on a second set of categorized data. At block 615, the method 600 may generate, by the server, a second random forest, the second random forest comprising the independent tree and N−1 trees from the first random forest.

At block 620, the method 600 may compare, by the server, a performance of the first random forest to a performance of the second random forest. The performance of the random forests may be a measure of how effectively the first random forest and the second random forest categorize and sort the second set of categorized data. In some cases, the method 600 may determine a first receiver operating characteristic of the first random forest based on running at least a first random subset of the second set of categorized data down the first random forest. In some cases, the method 600 may determine a second receiver operating characteristic of the second random forest based on running at least a second random subset of the second set of categorized data down the second random forest. In some cases, the method 600 may compare the first receiver operating characteristics of the first random forest to the second receiver operating characteristics of the second random forest.

At block 625, the method 600 may send, by the server, the independent tree to a client device based at least in part on the comparing. In some cases, the method 600 may generate an update that includes the independent tree and instructions to remove a selected tree from the first random forest and install the independent tree in the first random forest. In some cases, the method 600 may determine to send the independent tree to the client device based at least in part on the first and second receiver operating characteristics indicating the second random forest outperforms the first random forest. In some cases, the method 600 may send, by the server, the independent tree to the client device. In some cases, the method 600 may instruct, by the server, the client device to remove a selected tree from the first random forest on the client device. In some cases, the method 600 may instruct, by the server, the client device to implement the independent tree in the first random forest on the client device in place of the selected tree removed from the first random forest. In some configurations, the client device may be the device 105.

Figure 7:
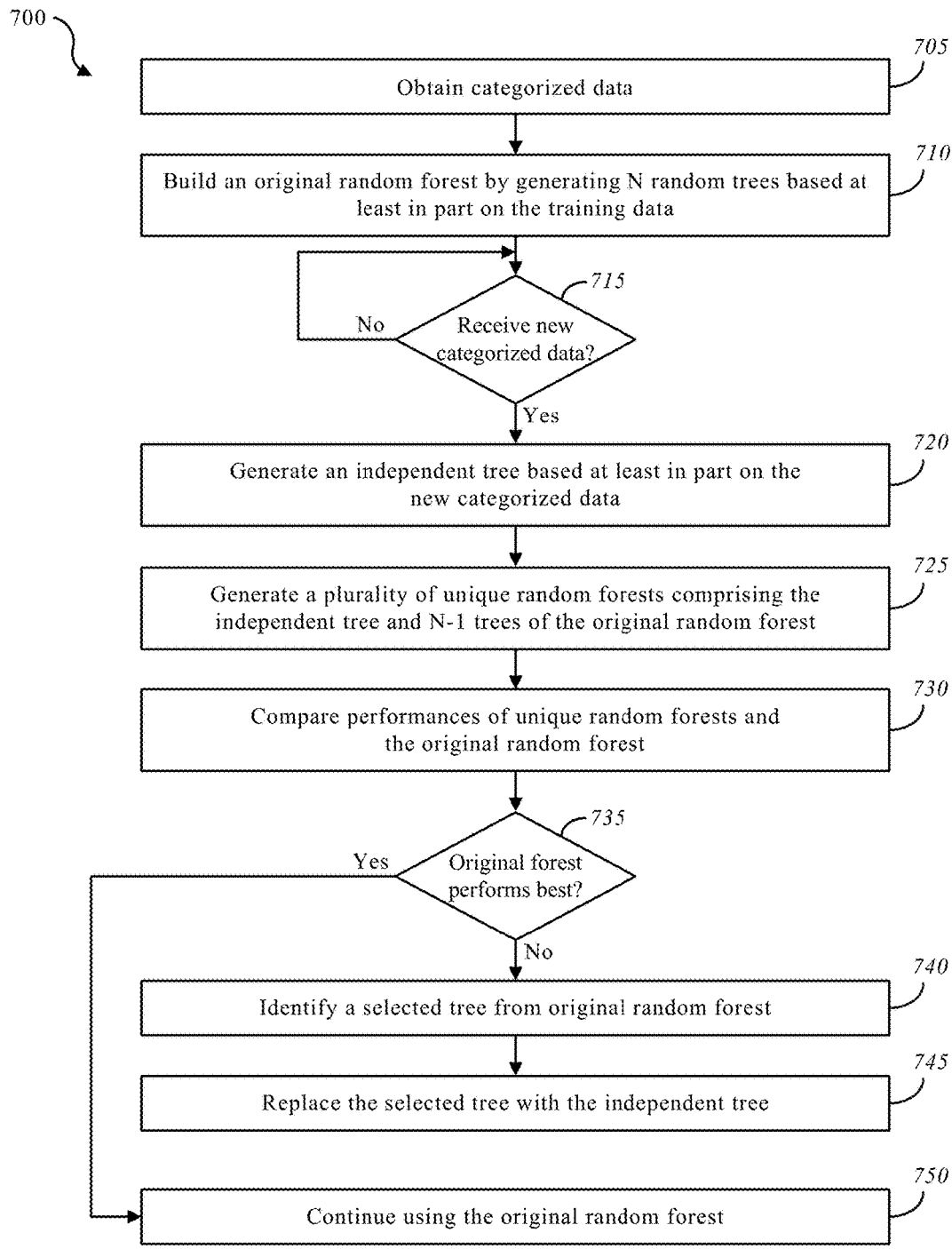
FIG. 7 is a flow diagram illustrating another embodiment of a method of refreshing random forests.

FIG. 7 is a flow diagram illustrating one embodiment of a method 700 for refreshing a random forest. In some configurations, the method 700 may be implemented by the update module 130 illustrated in FIGS. 1 and/or 2. In some configurations, the method 700 may be implemented in conjunction with the application 150, the user interface 145, and/or the update module 130 illustrated in FIG. 1.

At block 705, the method 700 may include obtaining categorized data. In some examples, the categorized data may be generated from other data received from other computing devices using a random forest to classify or sort data (e.g., device 105 or computing device 125). In some embodiments, the categorized data may be received directly from the other computing devices.

At block 710, the method 700 may build an original random forest by generating an N number of random trees based at least in part on the categorized data. The random forest being configured to classify or sort data. For example, the random forest may be used to determine whether a file includes malware.

At block 715, the method 700 may determine whether new categorized data has been received. The data being classified or sorted may change over time, which may reduce the effectiveness of the original random forest to sort and classify the desired data. Once it has been determined that a sufficient amount of new categorized data has been obtained, an update for the original random forest may be developed. Before any update of the original random forest is implemented, however, it may be determined whether an update based on the new categorized data would increase the effectiveness of the original random forest. In some examples, the update and the determination of whether an update would improve the effectiveness of the original random forest are determined simultaneously. If the method 700 determines that a sufficient amount of new categorized data has been received, the method 700 may move to execute block 720. Otherwise, the method may continue to execute block 715.

At block 720, the method 700 may generate an independent tree based at least in part on the new categorized data. In some examples, the independent tree is generated to replace a tree of the original random forest. In this way the original random forest is refreshed or updated with new data, which may improve the effectiveness of the original random forest.

At block 725, the method may generate a plurality of unique random forests. In some examples, the unique random forests comprise the independent tree and N−1 trees of the original random forest. When determining the effectiveness of a random forest, it may be more useful to measure the performance of an entire random forest rather than individual trees. The idea of a random forest is that averaging the results of a number of decision trees together may provide more accurate results than any decision tree alone. With this in mind, in some cases, poorly performing trees of the original random forest are selected by comparing the performances of a plurality of random forests. In some examples, each unique random forest may include the same number of trees as the original random forest, except a unique tree is replaced by the independent tree in each unique random forest.

At block 730, the method 700 may compare the performance of the unique random forests and the original random forest. In some examples, the performance of each random forest is determined by measuring the ROC curve of the random forest after running the new categorized data through the random forests.

At block 735, the method 700 determines which random forest of the plurality of unique random forests and the original forest was the most effective at classifying and sorting the new categorized data. If the original random forest was the top-performing random forest, the method 700 does not execute blocks 740, 745. If one of the plurality of unique random forests was the top performing random forests, the method 700 moves to execute block 740.

At block 740, the method 700 may identify a selected tree from the original random forest to replace with the independent tree. In some examples, the selected tree is identified by determining which decision tree from the original random forest is missing from the top-performing unique random forest.

At block 745, the method 700 may replace the selected tree with the independent tree. In some examples, an update is sent from a server to a computing device that uses the original random forest. The update may include data indicative of the new independent tree and may include instructions for the computing device to remove the selected tree from its copy of the original random forest and install the independent tree into the original random forest. In some cases, the number of leaf nodes in a decision tree are limited to cause each decision tree to have similar file sizes. As one example, the file size of each decision tree in a random forest may be 1 to 2 MBs in size.

Upon determining at block 735 that the original random forest performs best, at block 750 the method 700 may include continuing to use the original random forest at the client device. For example, in one embodiment, the method 700 may send a command to the client device to continue to use the original random forest. Alternatively, the method 700 may bypass sending any command to the client device upon determining the original random forest performs best. Thus, a client device may continue to use the original random forest to classify unknown files as malware files or clean files.

Figure 8:
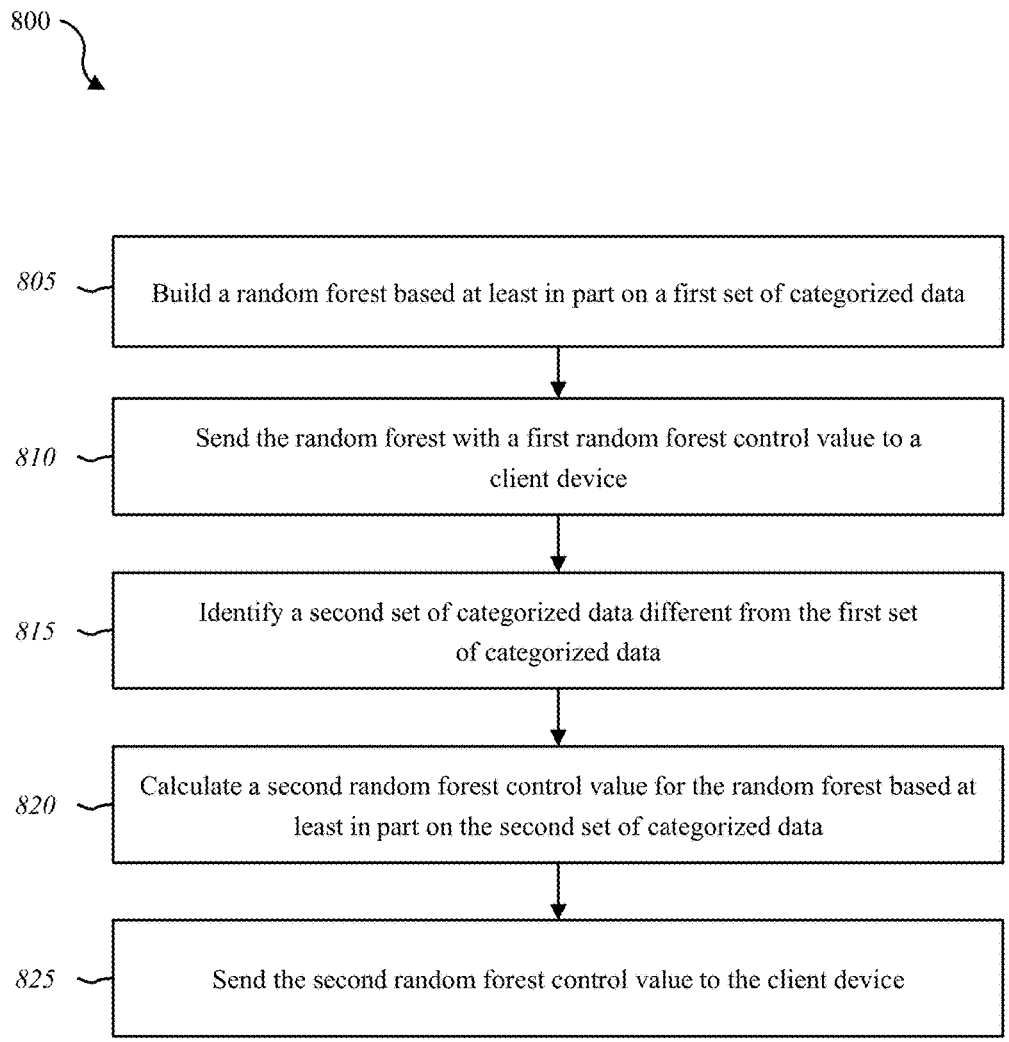
FIG. 8 is a flow diagram illustrating another embodiment of a method of refreshing random forests.

FIG. 8 is a flow diagram illustrating another embodiment of a method 800 for refreshing random forests. In some configurations, the method 800 may be implemented in conjunction with the application 150, the user interface 145, and/or the update module 130 illustrated in FIGS. 1 and/or.

Figure 9:
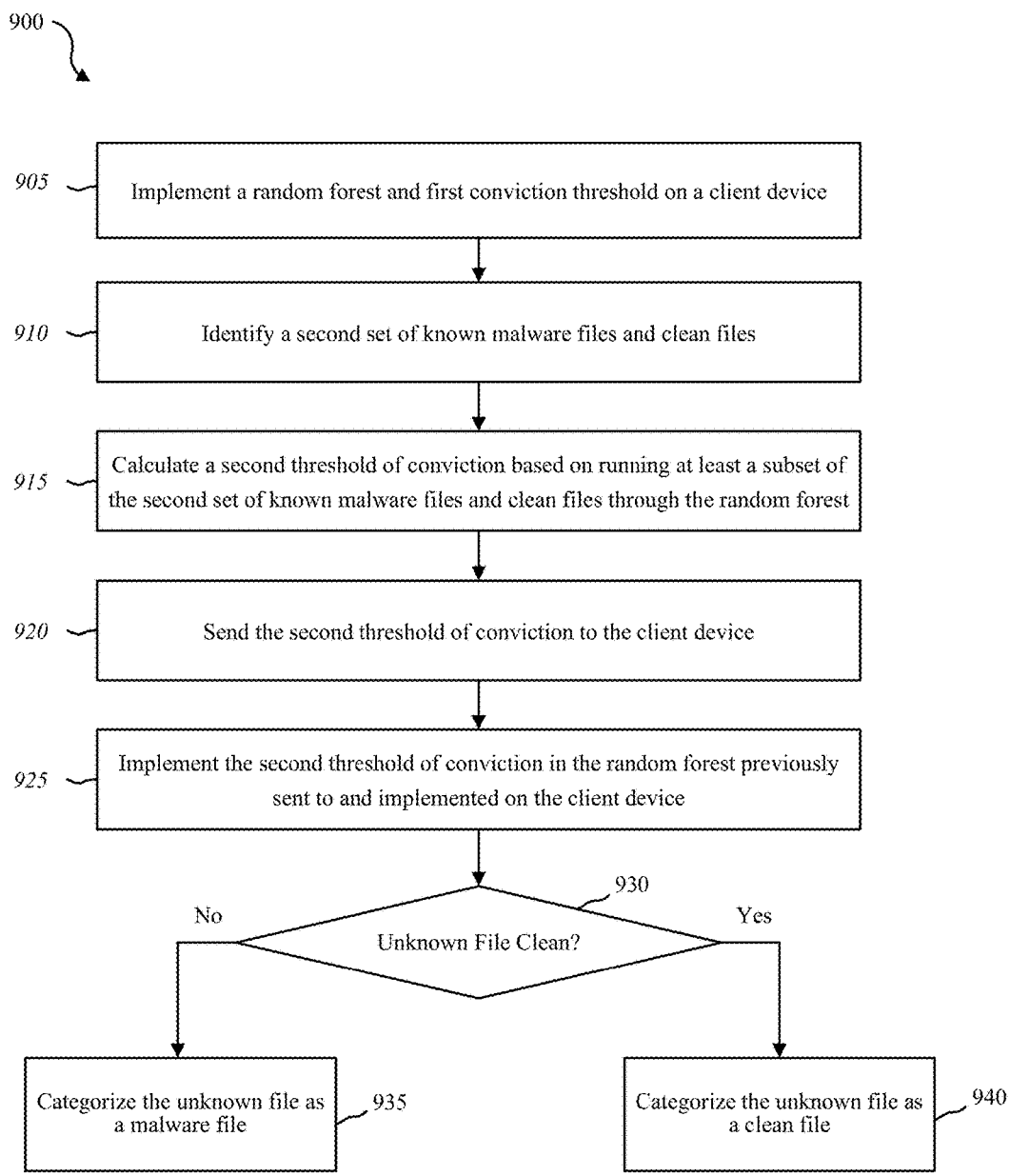
FIG. 9 is a flow diagram illustrating another embodiment of a method of refreshing random forests.

At block 805, method 800 may include building a random forest based at least in part on a first set of categorized data, the random forest comprising two or more binary decision trees. In some embodiments, the random forest may be built by a server. The random forest may include two or more binary decision trees. In some cases, test conditions for the nodes of each of the binary decision trees may be selected randomly. At block 810, method 800 may include sending the random forest to a client device with a first random forest control value. The random forest may be implemented on the client device in relation to the random forest control value. At block 815, method 800 may include identifying a second set of categorized data different from the first set of categorized data. At block 820, method 800 may include calculating a second random forest control value based on the second set of categorized data. At block 825, method 800 may include sending the second random forest control value to the client device FIG. 9 is a flow diagram illustrating another embodiment of a method 900 for refreshing random forests. In some configurations, the method 900 may be implemented in conjunction with the application 150, the user interface 145, and/or the update module 130 illustrated in FIGS. 1 and/or.

At block 905, method 900 may include implementing a random forest and first conviction threshold on a client device. In some cases, the method 900 may build the random forest based on running at least a subset of a first set of known malware files and known clean files through the random forest. In some embodiments, the method 900 may include determining one or more confidence scores for each binary decision tree of the random forest. In some configurations, the first threshold of conviction may be derived from the one or more confidence scores.

At block 910, method 900 may include identifying a second set of known malware files and clean files. At block 915, method 900 may include calculating a second threshold of conviction based on running at least a subset of the second set of known malware files and clean files through the random forest. At block 920, method 900 may include sending the second threshold of conviction to the client device. At block 925, method 900 may include implementing the second threshold of conviction in the random forest previously sent to and implemented on the client device. At block 930, the method 900 may determine whether to categorize an unknown file as malware or clean based on running the unknown file through the random forest implemented on the client device with the second threshold of conviction. Upon determining the unknown file is not clean, at block 935 method 900 may include categorizing the unknown file as a malware file. Conversely, upon determining the unknown file is clean, at block 940 method 900 may include categorizing the unknown file as a clean file.

Figure 10:
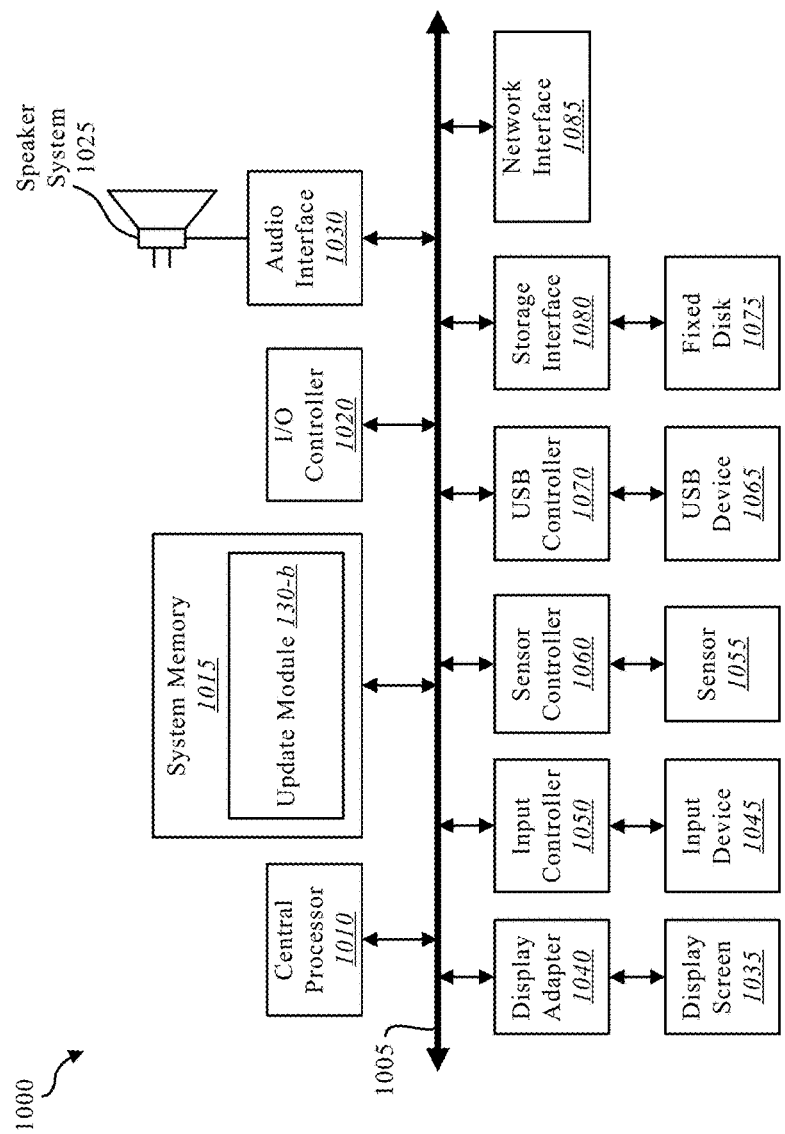
FIG. 10 is a block diagram of a computer system suitable for implementing the present systems and methods.

FIG. 10 depicts a block diagram of a computing system 1000 suitable for implementing the present systems and methods. The computing system 1000 may be an example of device 105, server 110, and/or computing device 125 illustrated in FIG. 1. In one configuration, system 1000 includes a bus 1005 which interconnects major subsystems of system 1000, such as a central processor 1010, a system memory 1015 (typically RAM, but which may also include ROM, flash RAM, or the like), an input/output controller 1020, an external audio device, such as a speaker system 1025 via an audio output interface 1030, an external device, such as a display screen 1035 via display adapter 1040, an input device 1045 (e.g., remote control device interfaced with an input controller 1050), multiple USB devices 1065 (interfaced with a USB controller 1070), and a storage interface 1080. Also included are at least one sensor 1055 connected to bus 1005 through a sensor controller 1060 and a network interface 1085 (coupled directly to bus 1005).

Bus 1005 allows data communication between central processor 1010 and system memory 1015, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components or devices. For example, the update module 130-*b* may be configured to implement the present systems and methods may be stored within the system memory 1015. Applications (e.g., application 150) resident with the system 1000 are generally stored on and accessed via a non-transitory computer-readable medium, such as a hard disk drive (e.g., fixed disk drive 1075) or other storage medium. Additionally, applications can be in the form of electronic signals modulated in accordance with the application and data communication technology when accessed via network interface 1085.

Storage interface 1080, as with the other storage interfaces of system 1000, can connect to a standard computer-readable medium for storage and/or retrieval of information, such as a fixed disk drive 1075. Fixed disk drive 1075 may be a part of system 1000 or may be separate and accessed through other interface systems. Network interface 1085 may provide a direct connection to a remote server via a direct network link to the Internet via a POP (point of presence). Network interface 1085 may provide such connection using wireless techniques, including digital cellular telephone connection, Cellular Digital Packet Data (CDPD) connection, digital satellite data connection, or the like. In some embodiments, one or more sensors (e.g., motion sensor, smoke sensor, glass break sensor, door sensor, window sensor, carbon monoxide sensor, and the like) connect to system 1000 wirelessly via network interface 1085.

Many other devices or subsystems (not shown) may be connected in a similar manner (e.g., entertainment system, computing device, remote cameras, wireless key fob, wall mounted user interface device, cell radio module, battery, alarm siren, door lock, lighting system, thermostat, home appliance monitor, utility equipment monitor, and so on). Conversely, all of the devices shown in FIG. 10 need not be present to practice the present systems and methods. The devices and subsystems can be interconnected in different ways from that shown in FIG. 10. The aspect of some operations of a system such as that shown in FIG. 10 are readily known in the art and are not discussed in detail in this application. Code to implement the present disclosure can be stored in a non-transitory computer-readable medium such as one or more of system memory 1015 or fixed disk drive 1075. The operating system provided on system 1000 may be iOS®, ANDROID®, MS-DOS®, MS-WINDOWS®, OS/2®, UNIX®, LINUX®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present systems and methods may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

The signals associated with computing system 1000 may include wireless communication signals such as radio frequency, electromagnetics, local area network (LAN), wide area network (WAN), virtual private network (VPN), wireless network (using 802.11, for example), cellular network (using 3G and/or LTE, for example), and/or other signals. The network interface 1085 may enable one or more of WWAN (GSM, CDMA, and WCDMA), WLAN (including BLUETOOTH® and Wi-Fi), WMAN (WiMAX) for mobile communications, antennas for Wireless Personal Area Network (WPAN) applications (including RFID and UWB), etc The I/O controller 1020 may operate in conjunction with network interface 1085 and/or storage interface 1080. The network interface 1085 may enable the computing system 1000 with the ability to communicate with client devices (e.g., device 105 of FIG. 1), and/or other devices over the network 115 of FIG. 1. Network interface 1085 may provide wired and/or wireless network connections. In some cases, network interface 1085 may include an Ethernet adapter or Fibre Channel adapter. Storage interface 1080 may enable the computing system 1000 to access one or more data storage devices. The one or more data storage devices may include two or more data tiers each. The storage interface 1080 may include one or more of an Ethernet adapter, a Fibre Channel adapter, Fibre Channel Protocol (FCP) adapter, a SCSI adapter, and iSCSI protocol adapter.

Figure 11:
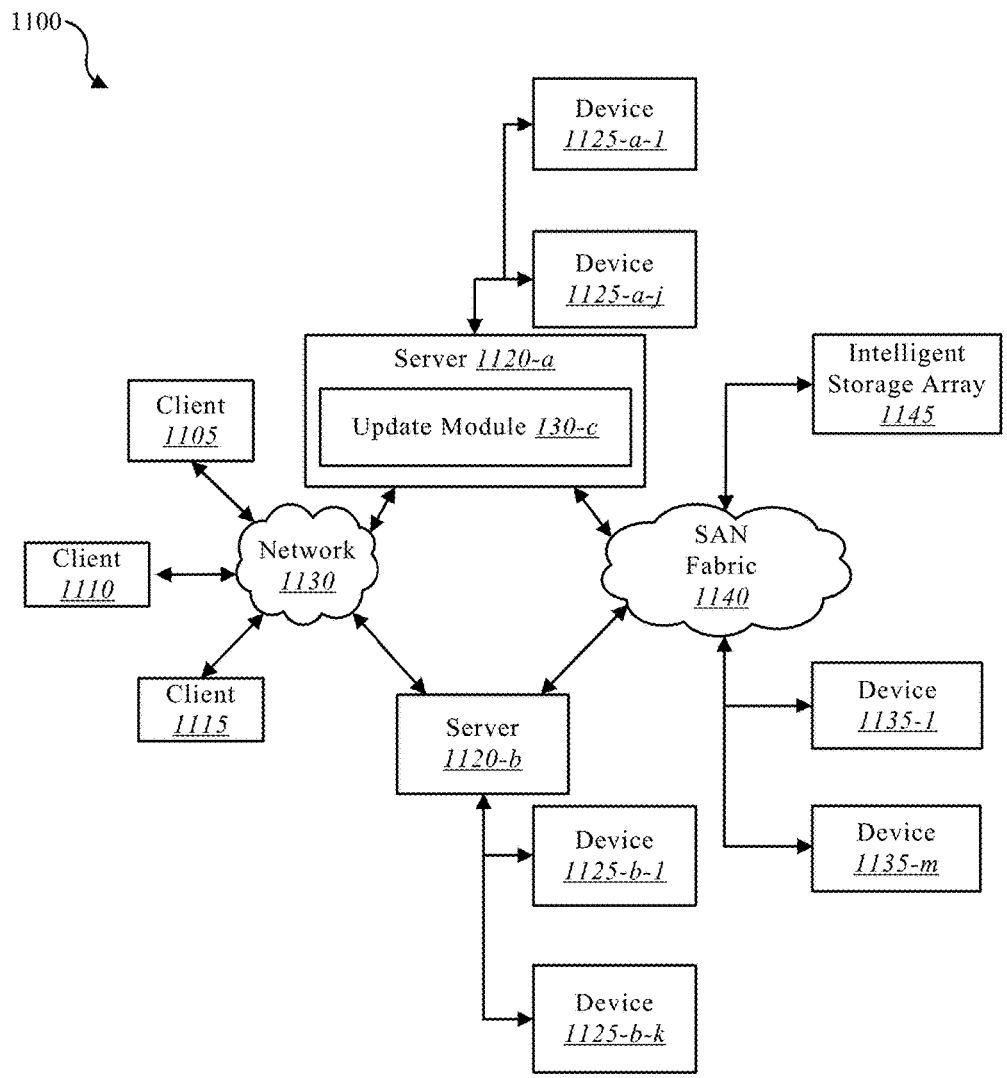
FIG. 11 is a block diagram of a computer system suitable for implementing the present systems and methods.

FIG. 11 is a block diagram depicting a network architecture 1100 in which client systems 1105, 1110 and 1115, as well as storage servers 1120-a and 1120-b (any of which can be implemented using computing system 600), are coupled to a network 1130. In one embodiment, the update module 130-c may be located within one of the storage servers 1120-a, 1120-b to implement the present systems and methods. an update module 130-c may be one example of an update module 130 depicted in FIGS. 1, 2, and/or 10. The storage server 1120-a is further depicted as having storage devices 1125-a-1 through 1125-a-j directly attached, and storage server 1120-b is depicted with storage devices 1125-b-1 through 1125-b-k directly attached. SAN fabric 1140 supports access to storage devices 1135-1 through 1135-m by storage servers 1120-a and 1120-b, and so by client systems 1105, 1110 and 1115 via network 1130. Intelligent storage array 1145 is also shown as an example of a specific storage device accessible via SAN fabric 1140.

With reference to computing system 600, network interface 685 or some other method can be used to provide connectivity from each of client systems 1105, 1110 and 1115 to network 1130. Client systems 1105, 1110 and 1115 are able to access information on storage server 1120-a or 1120-b using, for example, a web browser or other client software (not shown). Such a client allows client systems 1105, 1110 and 1115 to access data hosted by storage server 1120-a or 1120-b or one of storage devices 1125-a-1 to 1125-a-j, 1125-b-1 to 1125-b-k, 1135-1 to 1135-m or intelligent storage array 1145. FIG. 11 depicts the use of a network such as the Internet for exchanging data, but the present systems and methods are not limited to the Internet or any particular network-based environment.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The foregoing description, for purpose of explanation, has been described with reference to specific embodiments. However, the illustrative discussions above are not intended to be exhaustive or to limit the disclosure to the precise forms disclosed. Many modifications and variations are possible in view of the above teachings. The embodiments were chosen and described in order to best explain the principles of the present systems and methods and their practical applications, to thereby enable others skilled in the art to best utilize the present systems and methods and various embodiments with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising." In addition, the term "based on" as used in the specification and the claims is to be construed as meaning "based at least in part upon."

What is claimed is:

1. A method for optimizing computer detection of malware using pattern recognition by refreshing random classification forests, comprising:
   building, by a server, a random forest based at least in part on a first set of categorized data, the random forest comprising two or more binary decision trees each comprising at least one leaf node;
   sending, by the server, the random forest to a client device with a first random forest control value;
   identifying, by the server, a second set of categorized data different from the first set of categorized data, the first set of categorized data comprising a first set of known malware files and known clean files, and the second set of categorized data comprising a second set of known malware files and known clean files separate from the first set of known malware files and known clean files;
   calculating, by the server, a second random forest control value based on the second set of categorized data, the second random forest control value comprising one or more updates for the random forest, the updates for the random forest comprising one or more confidence scores associated with at least one of the leaf nodes of the binary decision trees of the random forest; and
   sending, by the server, the second random forest control value to the client device.

2. The method of claim 1, comprising:
   implementing the second random forest control value in the random forest on the client device in place of the first random forest control value;
   using the random forest that has implemented the second random forest control value to determine on the client device that a file likely includes malware; and
   performing a security action to protect the client device from the malware based at least in part on the second random forest control value.

3. The method of claim 2, comprising:
   calculating a first set of confidence scores based at least in part on the first set of categorized data, the first random forest control value comprising at least one of the first set of confidence scores and a first threshold of conviction; and
   calculating a second set of confidence scores based at least in part on the second set of categorized data, the second random forest control value comprising at least one of the second set of confidence scores and a second threshold of conviction.

4. The method of claim 1, building the random forest comprising:
   associating a random subset of the first set of categorized data with one of the binary decision trees of the random forest; and
   running the random subset of the first set of categorized data down the associated binary decision trees of the random forest.

5. The method of claim 4, the first set of categorized data comprising malware files and clean files, the random subset of the first set of categorized data comprising a random selection of at least one of the malware files and at least one of the clean files.

6. The method of claim 5, a number of malware files in the random subset equaling a number of clean files in the random subset.

7. The method of claim 2, calculating the first or second set of confidence scores comprising:
   calculating a confidence score for each leaf node of the random forest based at least in part on data from the first set of categorized data or the second set of categorized data being ran through the random forest.

8. The method of claim 2, calculating the first threshold of conviction for the random forest being based at least in part on an aggregate of the first set of confidence scores, and calculating the second threshold of conviction being based at least in part on an aggregate of the second set of confidence scores.

9. The method of claim 1, calculating the first or second thresholds of conviction comprising:
   calculating true positive and false positive rates for each leaf node of the random forest in conjunction with the first or second set of categorized data being ran through the random forest;
   generating a receiver operating characteristic (ROC) curve based on the calculated true positive and false positive rates of each leaf node; and
   selecting a value along the ROC curve.

10. The method of claim 1, the first set of categorized data comprising a first set of known malware files and known clean files, and the second set of categorized data comprising a second set of known malware files and known clean files separate from the first set of known malware files and known clean files.

11. A computing device configured for optimizing computer detection of malware using pattern recognition by refreshing random classification forests, comprising:
    a processor;
    memory in electronic communication with the processor, wherein the memory stores computer executable instructions that when executed by the processor cause the processor to perform the steps of:
    building, by a server, a random forest based at least in part on a first set of categorized data, the random forest comprising two or more binary decision trees each comprising at least one leaf node;
    sending, by the server, the random forest to a client device with a first random forest control value;
    identifying, by the server, a second set of categorized data different from the first set of categorized data, the first set of categorized data comprising a first set of known malware files and known clean files, and the second set of categorized data comprising a second set of known malware files and known clean files separate from the first set of known malware files and known clean files;
    calculating, by the server, a second random forest control value based on the second set of categorized data, the second random forest control value comprising one or more updates for the random forest, the updates for the random forest comprising one or more confidence scores associated with at least one of the leaf nodes of the binary decision trees of the random forest; and
    sending, by the server, the second random forest control value to the client device.

12. The computing device of claim 11, wherein the instructions executed by the processor cause the processor to perform the steps of:
    implementing the second random forest control value in the random forest on the client device in place of the first random forest control value;
    using the random forest that has implemented the second random forest control value to determine on the client device that a file likely includes malware; and
    performing a security action to protect the client device from the malware based at least in part on the second random forest control value.

13. The computing device of claim 12, wherein the instructions executed by the processor cause the processor to perform the steps of:
   calculating a first set of confidence scores based at least in part on the first set of categorized data, the first random forest control value comprising at least one of the first set of confidence scores and a first threshold of conviction; and
   calculating a second set of confidence scores based at least in part on the second set of categorized data, the second random forest control value comprising at least one of the second set of confidence scores and a second threshold of conviction.

14. The computing device of claim 12, wherein the instructions executed by the processor cause the processor to perform the steps of:
   calculating a confidence score for each leaf node of the random forest based at least in part on data from the first set of categorized data or the second set of categorized data being ran through the random forest.

15. The computing device of claim 12, calculating the first threshold of conviction for the random forest being based at least in part on an aggregate of the first set of confidence scores, and calculating the second threshold of conviction being based at least in part on an aggregate of the second set of confidence scores.

16. A non-transitory computer-readable storage medium storing computer executable instructions that when executed by a processor cause the processor to perform the steps of:
   building, by a server, a random forest based at least in part on a first set of categorized data, the random forest comprising two or more binary decision trees each comprising at least one leaf node;
   sending, by the server, the random forest to a client device with a first random forest control value;
   identifying, by the server, a second set of categorized data different from the first set of categorized data, the first set of categorized data comprising a first set of known malware files and known clean files, and the second set of categorized data comprising a second set of known malware files and known clean files separate from the first set of known malware files and known clean files;
   calculating, by the server, a second random forest control value based on the second set of categorized data, the second random forest control value comprising one or more updates for the random forest, the updates for the random forest comprising one or more confidence scores associated with at least one of the leaf nodes of the binary decision trees of the random forest; and
   sending, by the server, the second random forest control value to the client device.

17. The computer-program product of claim 16, wherein the instructions executed by the processor cause the processor to perform the steps of:
   implementing the second random forest control value in the random forest on the client device in place of the first random forest control value;
   using the random forest that has implemented the second random forest control value to determine on the client device that a file likely includes malware; and
   performing a security action to protect the client device from the malware based at least in part on the second random forest control value.

18. The method of claim 2, wherein the security action comprises at least one of preventing the file from performing actions on the computing device, alerting an administrator to the potential maliciousness of the file, quarantining the file, deleting the file, blocking a download of the file, and warning a user about the file, or any combination thereof.

19. The computing device of claim of claim 12, wherein the security action comprises at least one of preventing the file from performing actions on the computing device, alerting an administrator to the potential maliciousness of the file, quarantining the file, deleting the file, blocking a download of the file, and warning a user about the file, or any combination thereof.

20. The computer-program product of claim of claim 17, wherein the security action comprises at least one of preventing the file from performing actions on the computing device, alerting an administrator to the potential maliciousness of the file, quarantining the file, deleting the file, blocking a download of the file, and warning a user about the file, or any combination thereof.

* * * * *